United States Patent [19]
Tsui et al.

[11] Patent Number: 5,315,307
[45] Date of Patent: May 24, 1994

[54] DOPPLER FREQUENCY ANGLE MEASUREMENT TECHNIQUE

[75] Inventors: James B. Y. Tsui, Dayton; Rudy L. Shaw, Huber Heights; Nicholas A. Pequignot, Kettering, all of Ohio

[73] Assignee: The United States of America as represented by the Secretary of the Air Force, Washington, D.C.

[21] Appl. No.: 77,800

[22] Filed: Jun. 18, 1993

[51] Int. Cl.$^5$ ............................................. G01S 7/36
[52] U.S. Cl. ........................................ 342/444; 342/13
[58] Field of Search ............... 342/418, 432, 442, 444, 342/13

[56] References Cited

U.S. PATENT DOCUMENTS 3,735,400  5/1973  Sletten et al. ........................ 343/7.7
3,812,493  5/1974  Afendykiw et al. ............... 343/12 R
4,746,924  5/1988  Lightfoot ............................. 342/453
4,825,213  4/1989  Smrek ................................... 342/25

Primary Examiner—Mark Hellner
Attorney, Agent, or Firm—Bernard E. Franz; Thomas L. Kundert

[57] ABSTRACT

The technique allows precise angle-of-arrival (AOA) and radio frequency measurements on non-cooperative radar signals, by exploiting precise phase measurement capabilities of frequency measurement receivers. It is assumed that the intercept receivers with this capability are on board an aircraft and there are at least two antennas available. By utilizing the phase measurements, the incident frequency and incident phase angle are calculated using formulae derived under the disclosed technique. By taking multiple samples and averaging, angle measurement errors can be reduced.

2 Claims, 2 Drawing Sheets

DOPPLER FREQUENCY ANGLE MEASUREMENT TECHNIQUE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a Doppler frequency angle measurement technique, to measure an uncooperative radar's AOA (Angle-Of-Arrival), for a single aircraft application, employing two or more antennas with a frequency measurement receiver which accomplishes accurate phase measurement and appropriate processing.

The conventional Instantaneous Frequency Measurement (IFM) receiver is a radio frequency receiver used primarily in electronic warfare (EW). Its basic function is to measure the frequency of pulsed signals radiated from hostile radar. Generally, it may be said that IFM receivers measure the frequencies of incoming RF signals utilizing interferometric techniques by detecting the phase shift magnitudes produced in multiple, calibrated delay lines. For instance, the received RF signal is divided and simultaneously introduced into a non-delayed path and a delay line of known length. Since the phase differences between the delayed and non-delayed receiver paths are functions of the input signal frequency, conversion of the phase difference signals to video provides signals whose amplitudes are related to the phase delay. These video signals typically take the form $\sin \omega\tau$ or $\cos \omega\tau$, where $\omega$ is the angular frequency of the processed input signal and $\tau$ is the delay time. The $\sin \omega\tau / \cos \omega\tau$ are delivered to the encoding network which makes amplitude comparisons of the signals, determines the numerical value of $\omega$, and generates the digital frequency descriptive word.

An IFM receiver has many attractive features for EW applications, such as small size, light weight, wide instantaneous bandwidth, and fine frequency resolution.

In a digital RF receiver, the incident radiation is mixed with a local oscillator signal and down converted to an intermediate frequency (IF). This IF signal is discretely sampled and further processing is done using digital techniques. The frequency of the incident radiation may be determined by performing a discrete Fourier transform on the sampled signal.

United States patents by applicant James B. Y. Tsui, sole or et al, relating to frequency measurement receivers include (1) U.S. Pat. No. 4,663,516 issued Dec. 30, 1986 for an Instantaneous Frequency Measurement Receiver With Digital Processing; (2) U.S. Pat. No. 4,963,816 issued Oct. 16, 1990 for an Instantaneous Frequency Measurement (IFM) Receiver With Only Two Delay Lines; (3) U.S. Pat. No. 5,099,243 issued Mar. 24, 1992 for a Digital Frequency Measurement Receiver With Bandwidth Improvement Through Multiple Sampling of Complex Signals; and (4) U.S. Pat. No. 5,109,188 issued Apr. 28, 1992 for an Instantaneous Frequency Measurement Receiver With Bandwidth Improvement Through Phase Shifted Sampling of Real Signals. These patents are hereby incorporated by reference.

The following United States patents are of interest.

U.S. Pat. No. 4,825,213—Smrek
U.S. Pat. No. 4,746,924—Lightfoot
U.S. Pat. No. 3,812,493—Afendykiw et al.
U.S. Pat. No. 3,735,400—Sletten et al.

The above patents relate to systems and techniques for the location and tracking of targets. In particular, the Smrek patent describes a radar system and technique for use in detecting and tracking targets. The radar system is operatively connected to simultaneously receive signals at three antenna apertures. The signals are phase shifted and compared to produce difference signals representative of a target s motion and location.

The Lightfoot patent is directed to apparatus and methods for locating a target aircraft from a receiver aircraft by utilizing emissions from non-cooperative illuminators. The receiver includes a pair of wing tip antennas for receiving non-reflected emissions from the illuminators to determine the range from the receiver aircraft to the illuminators. Calculation of the location of the target is accomplished based on range and time differentials between the receipt of the reflected signals at the antennas and the receipt of a corresponding direct signal. The determination of the bearing of the target and the illuminator relative to the receiver is accomplished by an amplitude comparison of the signals received at multiple ports of a multiple beamed array antenna.

The Afendykiw et al patent relates to a radar system for determining the position of a target. The system uses an interferometer antenna and cross-correlation techniques to measure the time delay in receiving a reflected signal from the target as compared to receiving a direct signal from the signal source. Additionally, a plurality of interferometer antennas and cross-correlation techniques are used to measure the relative phase difference between the signals received the antennas to determine the angle of arrival of the reflected signals.

The Sletten et al patent describes an airborne moving target radar system utilizing three radar antennas placed on an aircraft in a line coincident with the aircraft flight velocity vector. Radar echo signals received by these antennas are filtered into narrow band channels. Signals in the clutter frequency are canceled, while signals from moving targets are compared by a phase comparator. The system then operates as an interferometer to provide target bearing information.

SUMMARY OF THE INVENTION

An objective of the invention is to allow precise angle-of-arrival (AOA) and radio frequency measurements on non-cooperative radar signals.

This invention exploits precise phase measurement capabilities currently being developed and tested. While it is not absolutely necessary for this discussion, it is assumed that the intercept receiver with this capability is on board an aircraft and there are at least two antennas available.

The invention relates to a system which includes two or more antennas and a receiver which measures phase angles. By utilizing the phase measurement, the incident frequency and incident phase angle are calculated using formulae derived under the technique of the invention. By taking multiple samples and averaging, angle measurement errors can be reduced.

Advantage and New Features: The potential exists for getting a relatively accurate angle measurement on a transmitter by exploiting new receiver technology which allows for accurate phase measurements. It can be employed without the need for special jinking techniques and over a larger bandwidth than current techniques will allow.

DETAILED DESCRIPTION

Many methods have been employed to measure an uncooperative radar's AOA, ranging from widely spaced receivers (i.e., multiple aircraft) to single aircraft approaches. This invention is designed for a single aircraft application. In employs two or more antennas, a radio frequency measurement receiver which accomplishes accurate phase measurement and appropriate processing. While this invention does not rely upon any manufacturer's product, a potential candidate for implementation and test would be with a Radio Frequency (RF) receiver being developed by Anaren Microwave, Inc. Anaren Microwave, under contract no. F33615-90-C-1414, with the Air Force Wright Laboratory, is developing a phase measurement receiver that measures very accurately the frequency of coherent radars. Recently, Anaren has proposed and has been experimenting with using this receiver to measure AOA with a single antenna by utilizing a special Doppler frequency compensation technique. The techniques described in this specification use two or more antennas but do not require the compensation approach employed by Anaren.

Figure 1:
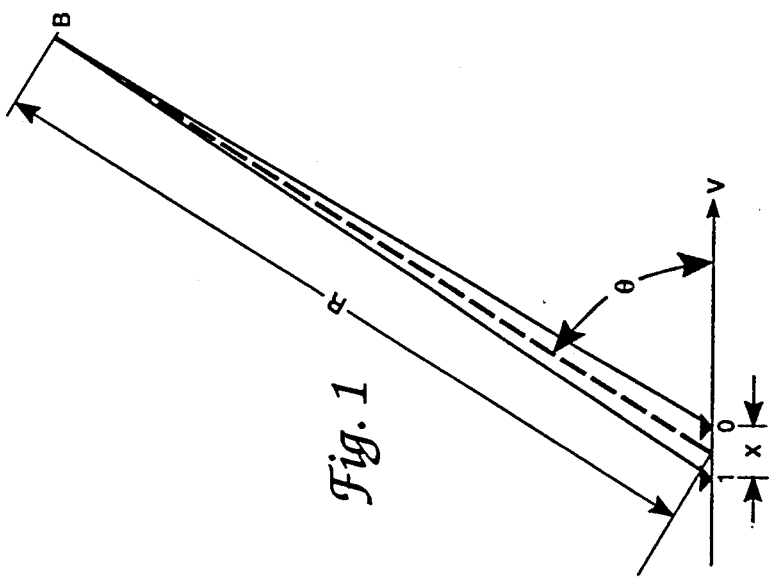
FIG. 1 is a diagram showing the signal geometry.

Invention Description:

1. FIG. 1 shows a two antenna system where the transmitter is at location B, the antennas are separated by x meters, and the receivers are traveling at some velocity v at the angle $\theta$ relative to B.

In general, it is assumed that at each antenna there are in phase and quadrature phase channels and that the output of the antenna at position 0 and at time 0 can be written in complex form as $$V_{0,0} = A\, e^{j\omega(1 + \frac{v}{c}\cos\theta)t_0} \tag{1}$$

Wherein, in $V_{0,0}$ the first subscript represents location and the second subscript represents time. A represents the amplitude of the signal, $\omega$ is the angular velocity of the emitter, v is the aircraft velocity, $\theta$ is the angle between the emitter and receiver, c is the speed of light, and $t_0$ is the initial time. In a similar manner $$V_{0,1} = A\, e^{j\omega(1 + \frac{v}{c}\cos\theta)t_1}$$

$$V_{1,0} = A\, e^{j\omega(1 + \frac{v}{c}\cos\theta - \frac{x}{ct_0}\cos\theta)t_0}$$

$$V_{1,1} = A\, e^{j\omega(1 + \frac{v}{c}\cos\theta - \frac{x}{ct_1}\cos\theta)t_1}$$

Where x is the distance between the antennas.

2. Now assume that the phase angles can be accurately measured and are represented as $$\theta_{0,0} = \omega\left(1 + \frac{v}{c}\cos\theta\right)t_0 \tag{2}$$

$$\theta_{0,1} = \omega\left(1 + \frac{v}{c}\cos\theta\right)t_1$$

$$\theta_{1,0} = \omega\left(1 + \frac{v}{c}\cos\theta - \frac{x\cos\theta}{ct_0}\right)t_0$$

$$\theta_{1,1} = \omega\left(1 + \frac{v}{c}\cos\theta - \frac{x\cos\theta}{ct_1}\right)t_1$$

which are the exponential terms in equation (1): Now let $$b = \theta_{1,0} - \theta_{0,0} = -\frac{\omega x}{c}\cos\theta \tag{3}$$

and $$a = \theta_{1,1} - \theta_{1,0} = \omega(t_1 - t_0)\left(1 + \frac{v}{c}\cos\theta\right) \tag{4}$$

in these two equations there are two unknowns $\omega$ and $\theta$. Solving them results in $$\cos\theta = \frac{-cb(t_1 - t_0)}{xa + vb(t_1 - t_0)} \tag{5}$$

$$\omega = \frac{1}{(t_1 - t_0)}\left[a + \frac{bv}{x}(t_1 - t_0)\right] \tag{6}$$

3. Errors in Calculating $\theta$: For this analysis first consider the following approximations to equations 4 and 5 for typical values of
v = 250 m/sec
x = 0.1 meter
c = 3 × 10⁸ m/sec
$\Delta t = t_1 - t_0 = 50 \times 10^{-9}$ sec
Using these values and letting $t_1 - t_0 = \Delta t$, equations 4 and 5 can be approximated as $$a \simeq \Delta t\, \omega \tag{7}$$

$$\cos\theta \simeq -\frac{cb\Delta t}{xa} \tag{8}$$

For calculating errors in $\theta$ it is assumed that all errors in $\theta$ are a result of measurement errors in a and b and we are interested in the change in $\theta$ as a function of the change in a and b. Taking the derivative of equation 8 results in $$-\sin\theta\, \delta\theta = \frac{(-c\Delta t \times a)\delta b + (c\Delta t \times b)\delta a}{(xa)^2}. \tag{9}$$

Dividing both the numerator and denominator of equation 9 by abcx results in $$-\sin\theta\, \delta\theta = \frac{bc\Delta t}{xa}\left[-\frac{\delta b}{b} + \frac{\delta a}{a}\right]. \tag{10}$$

Substitution of equations 3 and 7 into this equation results in $$-\sin\theta \, \delta\theta = -\cos\theta \left[ -\frac{\delta b}{b} + \frac{\delta a}{a} \right]. \quad (11)$$

or $$\delta\theta = \cot\theta \left[ -\frac{\delta b}{b} + \frac{\delta a}{a} \right]. \quad (12)$$

4. Boundary calculation example: Assume measurement errors in a and b to be ±0.03

$$-0.035 \leq \delta\theta \leq 0.035 \quad (13)$$

Substitution of equation 12 into equation 13 results in $$\tan\theta \geq 1.714 \quad (14)$$

$$\tan\theta \geq -1.714 \quad (15)$$

or $$\theta \geq 59.7° \quad (16)$$

$$\theta \geq -59.7° \quad (17)$$

Figure 2:
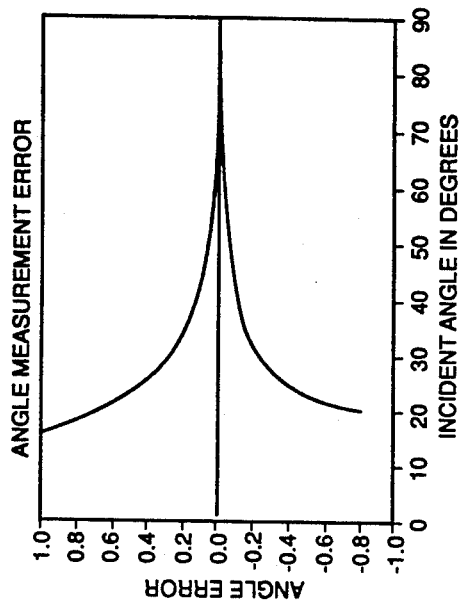
FIGS. 2 and 3 are graphs showing angle measurement error.
Figure 3:
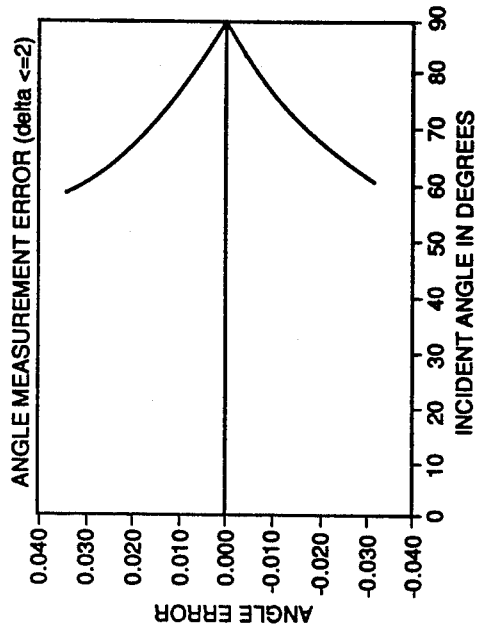

5. FIG. 2 shows the results of simulating the above conditions with the typical values and the measurement errors previously described. In FIG. 2, the x axis of the figure is the incident angle $\theta$ where $0 \geq \theta 90°$ and the y axis is the error represented by $(\theta \pm \theta)/\theta$. FIG. 3 used the same conditions but the data plotted were only those bounded as described in equation 13. It tracks very well with the calculated boundary values.

6. Conclusions: The invention described above utilizes two antennas and a receiver system which currently measures phase angles. By utilizing the phase measurement, equations 5 and 6 can be derived which allow approximation of the incident frequency $(\omega/2\pi)$ and the incident phase angle $(\theta)$. The errors described above represent only an analysis of a two sample approach. By taking multiple samples and averaging, the angle measurement errors will be significantly reduced from that described above. In addition, while the above disclosure describes a two antenna approach, by inclusion of a third (or multiple) antenna, the errors in angle measurements would be further reduced.

Figure 4:
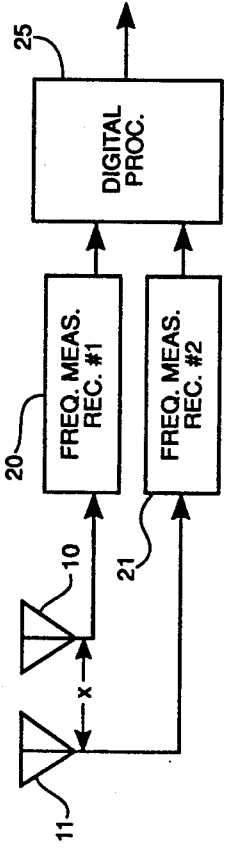
FIG. 4 is a block diagram of the system.

7. Receiver System: A simple block diagram of the receiver system is shown in FIG. 4. An antenna 10 is connected to the input of a first frequency measuring receiver 20, and antenna 11 is connected to the input of a second frequency measuring receiver 21. The outputs of the two receivers are connected to a digital processor 25. The receivers 20 and 21 may each be any suitable instantaneous or digital frequency measurement receiver which is capable of measuring the phase of received signals. One candidate for the receivers in that shown in FIG. 5.

Figure 5:
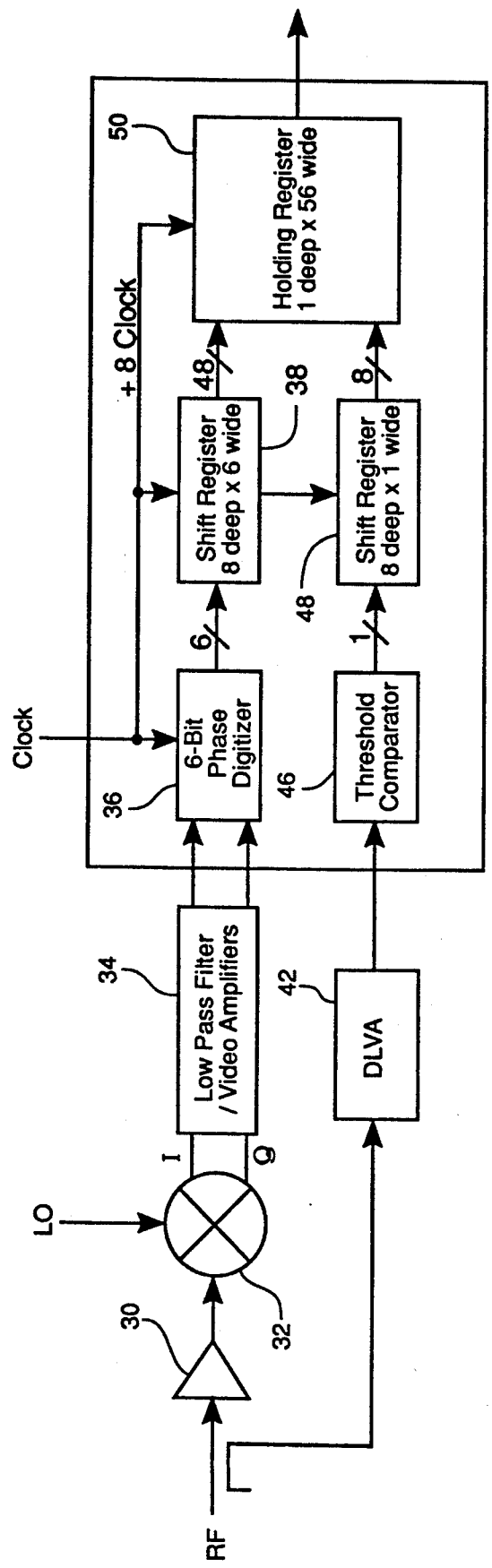
FIG. 5 is functional block diagram of a digital phase sampling receiver.

FIG. 5 is functional block diagram of the digital phase sampling radio frequency receiver being developed by Anaren Microwave, Inc., under contract no. F33615-90-C-1414 with the Air Force Wright Laboratory. It is a phase measurement receiver that measures very accurately the frequency of coherent radars. This receiver may be used as each of the two receivers shown in FIG. 4. The RF input from the antenna is coupled via a radio frequency amplifier 30 to mixing means 32, where it is mixed with signals from a local oscillator. In-phase and quadrature components from the mixer means 32 are supplied to a block 34 which includes low pass filters and video amplifiers. Outputs from block 34 are supplied to a 6-bit phase digitizer 36, and the digitized phase signals are coupled via a 6-conductor parallel line to a 8 deep by 6 wide shift register 38. The output from the shift register is supplied via a 48-conductor parallel line to a 1 deep by 56 wide holding register 50. The RF input is also coupled to a digital log video amplifier 42 to a threshold comparator 46, whose output is supplied to an 8 deep by 1 wide shift register 48. The output from the shift register 48 is supplied via an 8-conductor parallel line to the holding register 50. The output from the holding register 50 is supplied to the digital processor 25 of FIG. 4. Clock signals are supplied from a common source to the blocks 36, 38, 48 and 50.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A Doppler frequency angle measurement system using first and second antennas mounted on a vehicle, the antennas being coupled respectively to inputs of first and second receivers which measure phase angles, with digital outputs from the receivers coupled to digital processing means, to provide precise angle-of-arrival (AOA) and radio frequency measurements on radar signals from a non-cooperative transmitter;

wherein the antennas are separated by x meters, and the vehicle with the receivers is traveling at some velocity v at an angle $\theta$ relative to a line from the vehicle to the radar transmitter, the first and second antennas being designated as having positions 0 and 1 respectively, and the radar signals being measured at an initial time $t_0$ and a later time $t_1$;

wherein the receivers provide phase and quadrature phase channels;

wherein the measured phase angles are represented as $$\theta_{0,0} = \omega \left( 1 + \frac{v}{c} \cos\theta \right) t_0$$

$$\theta_{0,1} = \omega \left( 1 + \frac{v}{c} \cos\theta \right) t_1$$

$$\theta_{1,0} = \omega \left( 1 + \frac{v}{c} \cos\theta - \frac{x\cos\theta}{ct_0} \right) t_0$$

$$\theta_{1,1} = \omega \left( 1 + \frac{v}{c} \cos\theta - \frac{x\cos\theta}{ct_1} \right) t_1$$

wherein for the angles the first subscript represents location and the second subscript represents time, $\omega$ is the angular velocity of the emitter, c is the speed of light; letting $$b = \theta_{1,0} - \theta_{0,0} = -\frac{\omega x}{c}\cos\theta$$

and $$a = \theta_{1,1} - \theta_{1,0} = \omega(t_1 - t_0)\left(1 + \frac{v}{c}\cos\theta\right)$$

with two unknowns $\omega$ and $\theta$, solved to obtain results as $$\cos\theta = \frac{-cb(t_1 - t_0)}{xa + vb(t_1 - t_0)}$$

$$\omega = \frac{1}{(t_1 - t_0)}\left[a + \frac{bv}{x}(t_1 - t_0)\right]$$

wherein $\omega = 2\pi f$ provides the radar signal frequency and $\theta$ is the angle of arrival (AOA).

2. A doppler frequency angle measurement system according to claim 1, wherein angle measurement errors are reduced by taking multiple samples and averaging.

* * * * *